Nov. 4, 1947.  O. E. DEVER  2,430,163
MOTOR WHEEL
Filed Sept. 25, 1944   2 Sheets-Sheet 1
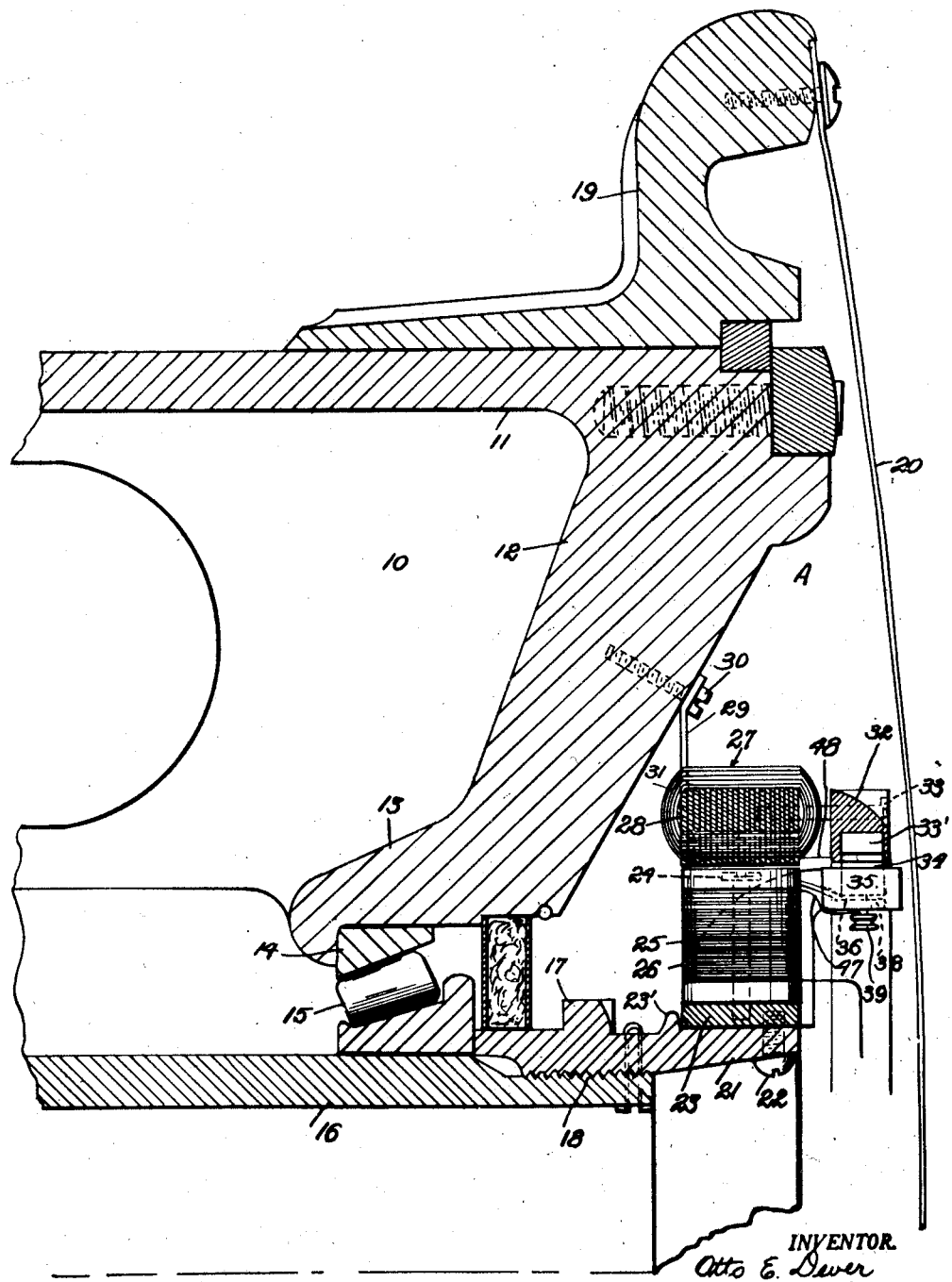
INVENTOR.
Otto E. Dever
BY Carlos J. Stratton
ATTORNEY Nov. 4, 1947.  O. E. DEVER  2,430,163
MOTOR WHEEL
Filed Sept. 25, 1944  2 Sheets-Sheet 2
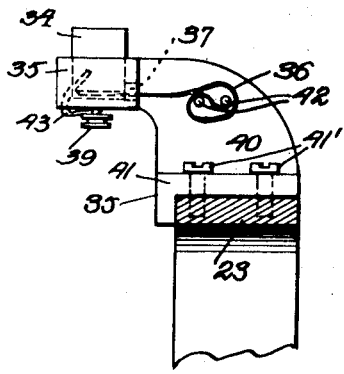
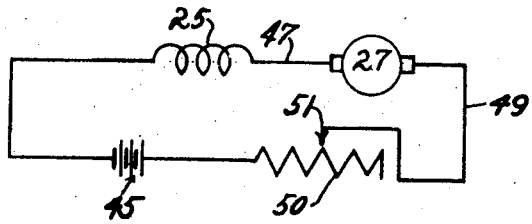
INVENTOR.
Otto E. Dever
BY Carlos G. Stratton
ATTORNEY Patented Nov. 4, 1947

2,430,163

UNITED STATES PATENT OFFICE 2,430,163

MOTOR WHEEL

Otto E. Dever, Burbank, Calif.

Application September 25, 1944, Serial No. 555,741

5 Claims. (Cl. 172—287)

My invention relates to a means for imparting rotation to rotatable elements, such as machine tools and instruments, the wheels of landing gears of aeronautical apparatus and the wheels of vehicles in general, and it has especial reference to self-propelling rotatable elements and wheels, the propelling instrument being an electric motor.

The chief objects of this invention are to provide a simple and efficient motor that is wholly self-contained and constitutes a complete, separate and independent entity that may be readily incorporated in any standard wheel or applied or attached to any rotatable instrument regardless of the metal of which it is fabricated, without the need to alter or reconstruct same and without calling into use any part or parts of such wheels or tools as essential adjuncts to or for the motor; and to provide a simplified motor which is wholly an integrated unit, conveniently attachable to and easily detachable from any wheel or other element.

Wheels with motors incorporated in them have been devised to provide traction for the running gear of vehicles, but these proposed motorized wheels are products of especial manufacture and design and the power unit or motor comprises a part of the wheel structure into which it is built, inseparable as a whole. Wheels so constructed are not only heavy and cumbersome, but are expensive to produce and require special motor installation for rotating them, and motors so incorporated are not usable in or attachable to other elements for driving them without such complete change over to adapt them to the new use as would make it impractical or impossible.

Other objects of the present invention therefore are to provide a light, economical and easily portable motor which may be installed in, or attached to, any wheel or other element in which the torque is caused to be exerted as close to the periphery of the wheel as the diameter of the motor will permit; and to provide a motor which is diametrically relatively large, is light and narrow, and develops a large amount of torque in proportion to its weight.

In this invention, the stator or field unit is stationarily mounted on a stationary part of the wheel assembly or axle and the rotor or armature is connected to the revolving part of the wheel, and hence because of the diametrical enlargement of the cooperating units of the motor, they may be made very narrow and the rotor armature which encircles the stator or field may be made uncommonly large diametrically, producing thus a high rotating torque at a point close to the periphery of the wheel or to the element to which it may be adapted.

It is also an object of the invention to provide in combination with a simplified motor of the character referred to, a commutator or simplified form, that is, where such an element is required, as in direct current motors, which may be readily associated with the rotor armature and which is so constructed that its weight and width are reduced to the least practical minimum.

It is a further object of the invention to provide a motor of the general character heretofore referred to in which the amount of wire required to wind the rotor slots for producing the exciting coils may be considerably reduced, thus affecting an appreciable economy in wire without impairing the efficiency of the motor, and materially reducing the motor weight.

It will be understood from the above that the invention concerns itself chiefly with rotatable elements on tools with self-contained power units to drive or rotate them, and to a motor combined with such elements, the motor because of its adaptation to this use, being characterized by special features and arrangements, as herein pointed out.

Other objects will appear from the following specification in connection with the accompanying drawings which are illustrative of a form of embodiment of the invention, that is obviously susceptible to many modifications and changes without departing from the sense and spirit of the invention.

The drawing illustrates an adaptation of the motor to a wheel of the type used in the landing gear of aeronautical apparatus and such a wheel may be the plain rotatable traction element of a landing gear or a rotatable unit for mounting a tread to enable a plane to negotiate muddy, swampy or unstable surfaces or rough terrain. In either instance, rotation of the wheel or tread-mounting unit prior to contact with the ground surface is desirable, in the first instance to prevent rapid disintegration of the rubber tires and facilitate eventual landing, and in the second instance to avoid destructive rupturing action of the tread and injury to the plane body at the time of contact with the ground. It is also desirable to power these wheels and units to cause them to propel the aeronautical apparatus after landing and independent of the power plant in the plane. The illustration is exemplary merely and it is understood that the present invention is incorporable in tools and machine elements and many other devices requiring rotative power.

In the drawings,

Fig. 1 is a fragmentary sectional elevation of a landing gear wheel of a plane, showing an embodiment of my invention.

Fig. 2 is a front elevation of Fig. 1 without the wheel.

Fig. 3 is an elevational side view partly in section, the section being taken on line 3—3 in' Fig. 2, showing a detail of one of the brush carriers.

Fig. 4 is a fragmentary sectional elevation taken on diagrammatic view of the electrical circuit.

Referring to the drawings, a fragment of a wheel structure is shown at 10, and includes a felly 11, spokes 12, where such are used, or a web, as in wheels of the disc type, and a hub portion 13, with a bearing assembly 14 of any conventional and approved type, including antifrictional means 15, for mounting and journaling a wheel on a hollow axle 16. The bearing assembly 14 and the wheel are held in place upon the axle 16 by a nut 17, engageable with the externally threaded end 18 of the hollow axle 16. The usual tire holding means 19 is also a complement of the wheel. It will be observed that in the disc type of wheels more generally used in landing gears of airplanes, the webs thereof are dished, providing thereby between the hub and felly a conical space A of considerable extent and of sufficient extent to accommodate the power unit hereinafter referred to. Such an accommodation is not only convenient, but essentially effective for securing the motive power wholly within the dimensional limits of the structure of the wheel, thereby obviating protrusion of any of the parts and rendering it possible to enclose or house the unit within the wheel proper and to protect it against injury or the effects of weather or foreign accumulations. As has been remarked, wheels of the disc type, so dished and recessed as to form chambers at the axle ends, are usual and common in the manufacture and therefore lend themselves admirably to an installation of the present disclosure, with but minor change to adapt it to the needs thereof.

The recessed chamber A of the wheel is sealed or at least covered by a plate 20.

The aforementioned nut 17 may be provided with an extension 21 projecting beyond the end of the hollow axle, as shown, which is a stationary part of the wheel structure or a suitable support may be extended from beyond the axle 16, where such a provision is desirable for any reason. On the extension is secured by screws 22 a field ring 23, to the outside circumference of which is secured in radially spaced relation and by screws 24 a plurality of field magnets 25, provided with the usual coils 26 of insulated wire. The field ring 23 is held against lateral movement axially on the nut 17 by a stop member 23' which is provided on and circumferentially of the nut and which limits the inward movement thereof, and by the said screws 22, which restrain the ring against outward movement thereof, the screws 22 making possible lateral adjustment of the field ring 23, with its field magnets 25, in order to obtain a correct setting of the field with respect to the armature 27. The armature 27 surrounds the field magnets 25, which as stated, are secured to the field ring 23, which in turn, is fixedly connected with the axle 16, that comprises the stationary element of the wheel assembly. So, surrounding the magnets, the armature 27 necessarily lies and operates outside the magnets, and consequently its diametral extent is many times increased beyond the ordinary limits of armatures, which must have a relatively small diameter consistent with and corresponding to the limitations imposed by a surrounding field, whether stationary or rotating. An armature or rotor 27 which surrounds the field magnets consequently may be diametrally very large and at the same time very narrow, both qualities being importantly inherent not alone in the rotor-armature but also in the field ring 23, and these qualities render the motor susceptible of ready application to the space provided by the dished wheels; but the prime importance which attaches to a diametrally enlarged rotor-armature operating about the circumferential exterior of radially spaced magnets as shown, is that the motor torque is caused to be exerted as close to the periphery of the wheel or other rotative element as possible. This obviously yields a high rotating torque and per unit weight exerts a greater torque.

The armature is built up of a series of laminated and insulated rings 28 concentric with respect to the field ring 23 and the hollow stationary axle 16 about which it revolves, and bolted together to present a solid unit. One or more of the rings 28 may be provided with lugs 29, projecting beyond the periphery thereof. These lugs are equally spaced and by means of them and bolts 30, the armature is secured to a rotating part of the wheel structure, that is to the wheel itself and preferably as shown. The armature core that is made up of the laminations or flat rings 28 is provided with the usual slots, grooves or channels, for the windings 31, which are preferably of the ring type, for the purpose of reducing the amount of wire without impairing the efficiency of the motor. A commutator bar or ring 32 is fastened to and supported on the outside of the armature 27 by screws 33 or in any other desirable manner. The commutator bar or rings 32 may be composed of a plurality of metallic bodies or members 33' molded or inset or embedded in a non-conducting material or ring of fibre or plastic. Brushes 34 cooperate with said commutator 32 and each of these brushes is contained in brush holder 35 and rests upon the ends of springs 36, the brushes being maintained in extended position beyond the holders 34, by said springs 36 that are interposed between said brushes 34 and the bottom 38 of said holder 35, which is provided with binding post 39. The holders 35 and 23 which are disposed intermediate each magnet 24, are provided with arms 40, having flanges 41, by which the arms and the brush holders are secured to the field ring 23 with bolts 41'.

Each of the aforenamed arms 40 is provided with a pair of spaced pins on lugs 42, about which is wound the spring 36, the end of which extends through and operates in a slot 37 in the brush holder 35, and presses upwardly against the brush therein. By means of a wire or conductor 43 fastened at one end to each brush 34 and at the other end to said binding posts 39, a shunt is provided in the electric circuit to maintain the brushes 34 in the circuit.

The brush holders are mounted around the outer circumference of the field ring and between said magnets 24, thereon, and extend outwardly therefrom so that they lie in plane beyond the vertical outside line of said stator field. Similarly, as explained, the commutator 32 is supported by and extends laterally of the rotor armature 27 and in a plane coinciding with the plane of the brushes 34. The armature 27 and commutator therefore rotate with the movable or rotating wheel, while the field and brushes remain stationary with the axle 16.

Referring to the diagrammatic view, Fig. 4, a source of electrical energy 45 is shown as a battery, but may be any other. One side of the battery 45 is connected by wire 46 to one side of the field coils which are series wound. The other side of the field coils 25, that is the ends thereof, is connected by lead 47 to the brushes 34, in contact with the commutator 32, which is connected by wire 49 leading to the armature 27 at one side, a wire 49, leading from the other side of the armature to a rheostat 50. The switch arm 51 is connected by lead 52 to the other side of the battery.

As will be understood, when the field is energized, the armature is caused to revolve about the field and thus to impart revolution to the wheel or wheels.

It will be apparent that while I have described my invention as relating to a wheel powering device including a motor having a field and armature and involving a direct electrical current, I would have it understood that an alternating current motor may be employed in exactly the same manner and for the same purpose, the essential changes needed in a device of this type being conventional and for that reason requiring no detailed explanation.

Manifestly, the invention is susceptible to many modifications and changes without departing from the spirit of the invention as expressed in the appended claims.

Having thus described my invention, what I claim and desire to secure by Letters Patent is:

1. A propelling means for elements mounted for rotation upon a non-rotating axle, comprising a nut secured to the end and providing an extension of said axle, a field ring fixed to said extension, a plurality of electro-magnet field units extending from the outer wall of said ring and circumferentially thereabout, a plurality of supports between said field units and secured to said field ring, brushes carried by said supports and disposed outwardly relatively to said magnetic field units, a rotor armature surrounding said magnetic field units, and including rings, at least one of said rings provided with means to fasten said armature to a rotatable element, a commutator carried by said armature and disposed in operative relation to said brushes, and means to fasten said commutator to said armature.

2. A self-propelled rotatable element, including a fixed shaft on which said element rotates, a nut on said shaft providing an extension for said shaft, a ring secured to said extension, a series of circumferentially disposed and spaced electro-magnet field units secured to the outside of said ring, supports in the spaces between said field units having laterally extending brush holders, tensioned brushes in said holders, a rotor armature surrounding said field units and including a series of parallel rings, at least one of said rings provided with means to secure same to said rotatable element, and a commutator secured to said armature and extending laterally therefrom and in concentric relation to said shaft.

3. In a device of the character referred to, a wheel, a fixed axle about which said wheel rotates, an extension threading on said axle and providing a support, a means to impart rotative motion to said wheel including an electric motor having a torque exerting field removably secured against rotation upon said support, and a torque responsive means surrounding said field and including rings, at least one of said rings having outwardly projecting lugs for attachment to said wheel whereby the line of torque is carried within the closest proximation to the wheel periphery, each part of said electrical motor being independently removable.

4. In a device of the character referred to, the combination of: a wheel, an armature including rings, at least one of which is provided with peripherally projecting lugs for rigidly and detachably connecting said armature to said wheel, a commutator connected and rotatable with said armature and wheel, a stationary axle, a nut secured to the end of said axle and provided with an extension, said extension having a stop member, a plurality of relatively spaced field magnets secured to said extension, arms secured to said extension intermediate said magnets, and brushes carried by said arms in cooperative relation to said commutator.

5. An attachment for a landing wheel of airplanes including a fixed axle, a nut threading on said axle and provided with an annular support extending beyond the end thereof, a ring rigidly and detachably secured to said support, a plurality of relatively spaced field magnets secured to said ring, a plurality of arms between said magnets and secured to said ring, said arms provided with holders, spring pressed brushes in said holders, an armature including rings, one of which is provided with spaced lugs for attachment to said wheel, and a commutator carried by said armature and disposed in cooperative relation to said brushes.

OTTO E. DEVER.

REFERENCES CITED

The following references are of record in the file of this patent:

UNITED STATES PATENTS

| Number | Name | Date |
| --- | --- | --- |
| 897,545 | Latovr | Sept. 1, 1908 |
| 1,747,560 | Weathers | Feb. 18, 1930 |
| 1,270,527 | Kingsbury | June 25, 1918 |
| 945,365 | Berg | Jan. 4, 1910 |